US012470258B2

United States Patent
Wang et al.

(10) Patent No.: US 12,470,258 B2
(45) Date of Patent: Nov. 11, 2025

(54) USER EQUIPMENT IDENTITY MANAGEMENT FOR COORDINATING BASE STATIONS

(71) Applicant: GOOGLE LLC, Mountain View, CA (US)

(72) Inventors: Jibing Wang, San Jose, CA (US); Erik Stauffer, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 583 days.

(21) Appl. No.: 17/908,675

(22) PCT Filed: Feb. 12, 2021

(86) PCT No.: PCT/US2021/017753
§ 371 (c)(1),
(2) Date: Sep. 1, 2022

(87) PCT Pub. No.: WO2021/178122
PCT Pub. Date: Sep. 10, 2021

(65) Prior Publication Data
US 2023/0119526 A1 Apr. 20, 2023

Related U.S. Application Data

(60) Provisional application No. 62/985,674, filed on Mar. 5, 2020.

(51) Int. Cl.
*H04B 7/024* (2017.01)
*H04W 76/11* (2018.01)

(52) U.S. Cl.
CPC ............ *H04B 7/024* (2013.01); *H04W 76/11* (2018.02)

(58) Field of Classification Search
CPC ...... H04B 7/024; H04W 72/23; H04W 76/11; H04W 72/231; H04W 72/232
See application file for complete search history.

(56) References Cited

U.S. PATENT DOCUMENTS

2010/0238909 A1 9/2010 Kim
2010/0255852 A1 10/2010 Chen et al.
(Continued)

FOREIGN PATENT DOCUMENTS

WO WO-2010/068011 A2 6/2010
WO WO-2016011846 A1 * 1/2016 ............ H04W 16/10
(Continued)

OTHER PUBLICATIONS

WO2016011846A1—English Translated (Year: 2025).*
International Search Report and Written Opinion for Application No. PCT/US2021/017753, dated May 14, 2021.

*Primary Examiner* — Ji-Hae Yea
(74) *Attorney, Agent, or Firm* — Womble Bond Dickinson (US) LLP

(57) ABSTRACT

In a radio access network (RAN), a method for increasing network efficiency includes partitioning a pool of identifiers into at least a plurality of identifier sets associated with a plurality of respective sets of base stations in the RAN. The identifier sets include a first identifier set associated with a first base station set of the plurality of respective sets of base stations. The method also includes determining that the first base station set is to serve a user device and assigning a first identifier from the first identifier set to the user device. The method further includes transmitting the first identifier to the user device and jointly transmitting, by at least two base stations of the first base station set, information to the user device via a channel, including using the first identifier to indicate that the channel carries information for the user device.

20 Claims, 12 Drawing Sheets

(56) References Cited

U.S. PATENT DOCUMENTS

| | | | |
|---|---|---|---|
| 2013/0034064 | A1 | 2/2013 | Nam et al. |
| 2015/0085749 | A1 | 3/2015 | Eravelli et al. |
| 2016/0037511 | A1 | 2/2016 | Vincze et al. |
| 2017/0127272 | A1* | 5/2017 | Kela ........................ H04W 8/26 |
| 2017/0208584 | A1 | 7/2017 | Qu et al. |
| 2017/0223763 | A1* | 8/2017 | Rahman ................ H04W 76/15 |
| 2018/0269939 | A1 | 9/2018 | Hu et al. |
| 2018/0332507 | A1* | 11/2018 | Fujishiro ......... H04W 36/00692 |
| 2019/0045573 | A1 | 2/2019 | Schliwa-Bertling et al. |
| 2020/0178131 | A1 | 6/2020 | Wang et al. |
| 2021/0168781 | A1* | 6/2021 | Lee ........................ H04W 72/23 |
| 2021/0329518 | A1* | 10/2021 | Sharma ............... H04W 36/322 |
| 2022/0256411 | A1* | 8/2022 | Liu ................. H04W 36/00698 |

FOREIGN PATENT DOCUMENTS

| | | | |
|---|---|---|---|
| WO | WO-2019/24251 | A1 | 2/2019 |
| WO | WO-2019/216599 | A1 | 11/2019 |

* cited by examiner

USER EQUIPMENT IDENTITY MANAGEMENT FOR COORDINATING BASE STATIONS

FIELD OF THE DISCLOSURE

This disclosure relates generally to wireless communications and, more particularly, to strategies for coordinating base station sets to communicate with user devices in wireless communication systems.

BACKGROUND

In wireless communication networks, user devices (commonly referred to using the acronym "UE" for "user equipment") communicate with base stations of a radio access network (RAN). To improve UE throughput and mobility, the coordination of base stations has been proposed. By coordinating with each other, base stations can, for example, increase coverage areas and improve link budgets (e.g., by jointly transmitting and/or receiving data to and/or from individual UEs), and reduce inefficiencies and/or disruptions associated with more traditional handover procedures, thereby improving overall network efficiency. However, base station coordination introduces its own technical challenges.

For example, a single base station may simultaneously belong to two different base station coordination sets. Because UEs can communicate with that shared base station in different contexts (i.e., communicating with the shared base station as part of a first base station set or as part of a second base station set), ambiguities can arise. In some situations, for example, a UE being served by the first base station set may be unable to determine whether a particular downlink channel from the shared base station is intended for that UE, or is instead intended for some other UE being served by the second base station set, resulting in network inefficiencies.

SUMMARY

According to the techniques of this disclosure, a RAN including sets of coordinating base stations (referred to herein as "active coordination sets" or "ACSs") partitions a pool of available UE identifiers (referred to herein as "ACS-RNTIs," where "RNTI" refers to a Radio Network Temporary Identifier) into non-overlapping (i.e., mutually-exclusive) identifier sets, such that each ACS corresponds to a different set of identifiers. When the RAN determines that a particular ACS is to serve a UE (e.g., based on a request or other indication from the UE), the RAN assigns an ACS-RNTI to the UE from the identifier set associated with that ACS. Each of the ACS's base stations can use the ACS-RNTI to indicate that an uplink channel carries information for the UE from the ACS (e.g., by using the ACS-RNTI assigned to that UE to scramble a cyclic redundancy check (CRC)). Correspondingly, after the ACS transmits the ACS-RNTI to the UE, the UE can use its assigned ACS-RNTI to identify that the uplink channel carries information for the UE (e.g., by de-scrambling the CRC using the ACS-RNTI). Because the identifier sets of different ACSs are non-overlapping, a base station included in both a first ACS and a second ACS can distinguish a channel intended for a first UE served by the first ACS from a channel intended for a second UE served by the second ACS.

If the RAN determines that a new ACS is to serve the UE (e.g., because the UE is moving towards a coverage area of the new ACS, or because network needs dictate a change in ACS composition), then the RAN assigns an ACS-RNTI to the UE from the identifier set associated with the new ACS. The RAN can then transmit the new ACS-RNTI to the UE. For example, one or more base stations in the first ACS can transmit the new ACS-RNTI to the UE, so that the UE may prepare to receive and decode signals from the new ACS using the new ACS-RNTI.

The UE may determine when to utilize the new ACS-RNTI through trial-and-error. For example, the UE can continue to use the first ACS-RNTI that the UE received from the RAN to decode received signals until the decoding is unsuccessful. If unsuccessful, the UE can switch to using the new ACS-RNTI. In other implementations, the RAN can indicate to the UE when the UE should start using a particular ACS-RNTI by transmitting a control signal including timing information to the UE.

The UE can also provide information that helps the RAN determine when to transmit an ACS-RNTI and/or when to switch to serving a UE with a new ACS. For example, hardware constraints may cause a timing gap between the time when a UE receives a new ACS-RNTI and the time when the UE can actually start to use the new ACS-RNTI. Thus, in some implementations, the UE can transmit to the RAN a capability message including the timing gap, and the RAN can adjust the timing, based on that timing gap, of when the base stations in the new ACS use the new ACS-RNTI for communications to the UE.

One example embodiment of these techniques is a method, in a RAN, for improving network efficiency. The method includes partitioning, by processing hardware of the RAN, a pool of identifiers into at least a plurality of identifier sets associated with a plurality of respective sets of two or more base stations in the RAN. The plurality of identifier sets includes a first identifier set associated with a first base station set of the plurality of respective sets of two or more base stations. The method also includes determining, by the processing hardware, that the first base station set is to serve a user device and assigning a first identifier from the first identifier set to the user device. The method further includes transmitting the first identifier to the user device and using, by the first base station set, the first identifier to indicate a channel carrying information for the user device.

Another example embodiment of these techniques is a RAN with hardware and configured to implement the method above.

An additional embodiment of these techniques is a method, in a user device, for improving network efficiency. The method includes receiving a first identifier from a RAN configured to partition a pool of identifiers into at least a plurality of identifier sets associated with a plurality of respective sets of two or more base stations in the RAN. The plurality of identifier sets includes a first identifier set associated with a first base station set of the plurality of sets of two or more base stations, and the first identifier set includes the first identifier. The method further includes identifying, by processing hardware of the user device and using the first identifier, a first channel carrying information for the user device from the first base station set.

Another example embodiment of these techniques is a user device with hardware and configured to implement the method above.

DETAILED DESCRIPTION OF THE DRAWINGS

Figure 1:
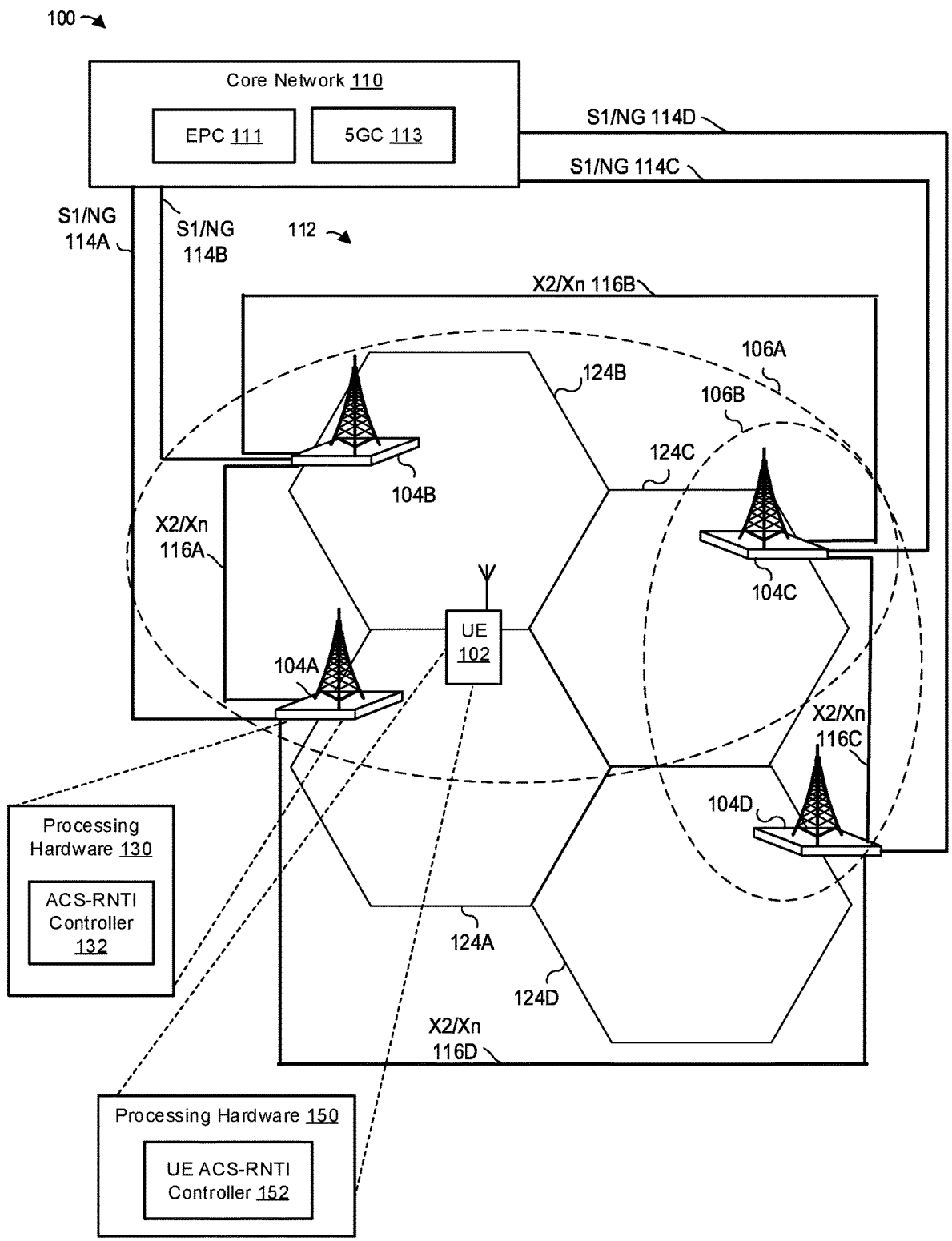
FIG. 1 is a block diagram of an example system in which a RAN and UE can implement the techniques of this disclosure for managing utilization of ACS identifiers.

FIG. 1 illustrates an example communication system 100 in which the techniques of this disclosure for managing utilization of ACS-specific UE identifiers (referred to herein as ACS-RNTIs), and related procedures, can be implemented. The communication system 100 includes a UE 102 and a RAN 112 that connects the UE 102 with a core network (CN) 110. The UE 102 can be any suitable device capable of wireless communication (e.g., any of the exemplary user devices discussed below, after the description of the figures). The UE 102 includes processing hardware 150, which may include one or more general-purpose processors (e.g., CPUs) and a computer-readable memory storing machine-readable instructions executable on the general-purpose processor(s), and/or special-purpose processing units. The processing hardware 150 in the example implementation of FIG. 1 includes a UE ACS-RNTI controller 152 that configures the UE 102 to use received ACS-RNTIs. The UE ACS-RNTI controller 152 may also be configured to manage requests to the RAN 112 to assign a new ACS to the UE 102 based on signal quality measurements. The UE 102 can receive ACS-RNTIs from the RAN 112, and utilize the received ACS-RNTIs, using techniques described in further detail below.

The RAN 112 includes base stations 104A-D that operate according to one or more radio access technologies (RATs). The base stations 104A-D can be any suitable type, or types, of base stations, such as an evolved node B (eNB), a next-generation eNB (ng-eNB), or a 5G Node B (gNB), for example. The base stations 104A-D support cells 124A-D, respectively. The UE 102 can communicatively connect with the RAN 112 via the base station 104A while operating in the cell 124A, for example, and can communicatively connect with the CN 110 via the RAN 112. While the cells 124A-D are depicted as non-overlapping in FIG. 1 for simplicity, neighboring cells partially overlap such that the UE 102 can be in range to communicate with more than one base station at a time.

The base station 104A includes processing hardware 130, which may include one or more general-purpose processors (e.g., CPUs) and a computer-readable memory storing machine-readable instructions executable on the general-purpose processor(s) and/or special-purpose processing units. While FIG. 1 depicts only the base station 104A as including the processing hardware 130, it is understood that each of the base stations 104B-D includes the same or similar elements. The processing hardware 130 in the example implementation of FIG. 1 includes an ACS-RNTI controller 132 configured to partition, or assist in the partitioning of, ACS-RNTIs amongst base station sets (ACSs) of the RAN 112, and to perform the techniques disclosed herein for assigning and utilizing ACS-RNTIs for UEs communicating with the RAN 112. The ACS-RNTI controller 132 and the UE ACS-RNTI controller 152 can each be implemented using any suitable combination of hardware, software, and/or firmware. In one example implementation, each of the controllers 132, 152, is a respective set of instructions that the respective processing hardware 130 or 150 executes to perform the various functions described herein.

Two or more base stations of the RAN 112 may coordinate to form a coordinated base station set, referred to herein as an active coordination set (ACS). In FIG. 1, for example, the base stations 104A, 104B, and 104C form a first ACS, ACS1 106A, and the base stations 104C and 104D form a second ACS, ACS2 106B. Thus, the base station 104C operates as a part of both the ACS 106A and the ACS 106B. The base station composition of different ACSs (such as the ACSs 106A and 106B) differs by at least one base station (i.e., for any two ACSs, at least one of those ACSs includes at least one base station not included in the other ACS). While FIG. 1 depicts the RAN 112 as including four base stations 104A-D and two ACSs 106A-B, the RAN 112 may include any number of base stations which may coordinate to form any number of ACSs of varying size. As will be further discussed below, the UE 102 may dictate the formation of ACSs in the RAN 112, and the ACS serving the UE 102 may change over time as the UE 102 moves or as channel conditions for the UE 102 change.

To directly exchange messages with each other, the base stations 104A-D may each support an X2 or Xn interface 116A-D (respectively). The base stations 104A-D, during the various scenarios discussed below, may communicate/coordinate with each other using the interfaces 116A-D.

Depending on the implementation and/or scenario, each of the ACSs 106A-B can communicate with the UE 102 either by transmitting to the UE 102 using a single base station, or by transmitting to the UE 102 using a subset or all of the base stations of the ACS (i.e., by joint transmission). Each ACS 106A-B may have a master base station that coordinates joint transmission or that assigns a particular base station of the ACS to transmit to the UE 102. To facilitate joint transmission, the master base station (or another base station of the ACS that the master assigns) may generate control information or data to be sent to the UE 102, and distribute the control information or data to the other base stations of the ACS via interfaces such as the interfaces 116A-D. Each base station of the ACS (such as each of the base stations 104A-C of the ACS1 106A) can transmit a wireless signal including the control information or data to the UE 102 at the same time (or after applying a timing advance to account for distance to the UE 102 and the corresponding propagation time) and using the same frequency. The UE 102 can then receive and aggregate the downlink signals to obtain a stronger combined signal, and can demodulate and decode the combined signal.

Generally speaking, unless noted otherwise, references herein to an ACS "transmitting" and "receiving" refer to joint transmission and joint reception by the base stations of the ACS. Depending on implementation and/or scenario (e.g., depending on channel conditions), an ACS can also transmit and receive via a subset of the base stations of the ACS.

As noted above, the RAN 112 connects the UE 102 to the CN 110. The CN 110 may be a fifth-generation core (5GC) 113, a less advanced core (e.g., an evolved packet core (EPC) 111), or a more advanced core. Accordingly, each of the base stations 104A-D support at least one interface 114A-D (respectively), such as an Si interface or an NG interface, for communicating with the CN 110. For example, each of the base stations 104A-D can be an eNB supporting an Si interface for communicating with the EPC 111, an ng-eNB supporting an NG interface for communicating with the 5GC 113, or a base station that supports the NR radio interface as well as an NG interface for communicating with the 5GC 113.

Figure 2:
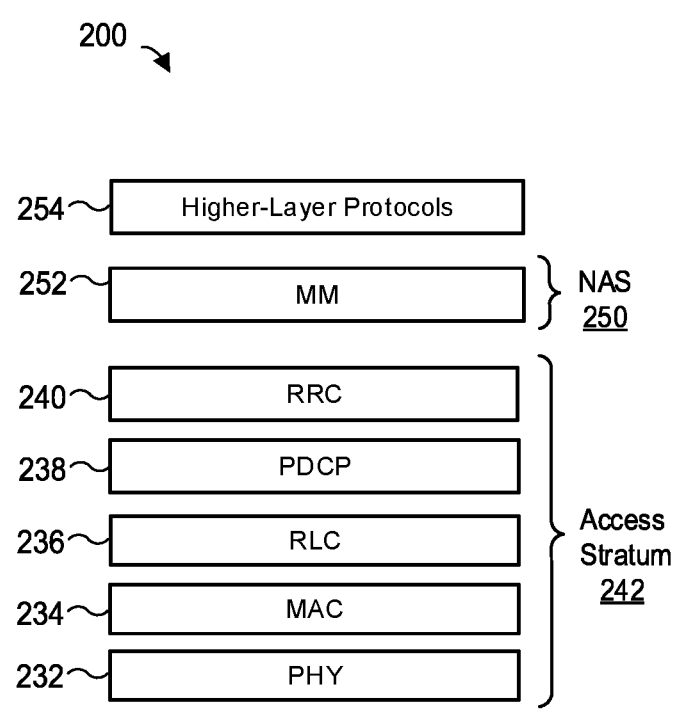
FIG. 2 is a block diagram of an example protocol stack, according to which the UE of FIG. 1 can communication with the base stations of FIG. 1.

The base stations 104A-D and the UE 102 each support a protocol stack 200, illustrated in a simplified manner in FIG. 2. In this example implementation, the protocol stack 200 includes a physical (PHY) layer 232, a medium access control (MAC) layer 234, a radio link control (RLC) layer 236, a packet data convergence protocol (PDCP) layer 238, and a radio resource control (RRC) layer 240, as parts of an access stratum 242. A non-access stratum (NAS) 250 of the protocol stack 200 may include, among other layers, one or more mobility management (MM) layers 260 for handling registration, attachment, or tracking area update procedures. The protocol stack 200 may also support higher-layer protocols 254 for various services and applications. For example, the higher layer protocols may include Internet Protocol (IP), Transmission Control Protocol (TCP), or User Datagram Protocol (UDP). The functions performed by the controllers 132, 152 may occur at the PHY layer 232, the MAC layer 234, a higher layer of the protocol stack 200, or at two or more layers, depending on the implementation. The various layers 232, 234, 236, 238, 240, 252, and 254 may be ordered as shown in FIG. 2. It is understood, however, that in some implementations and/or situations, one or more of the depicted layers may operate in a manner that does not strictly conform to the ordering shown in FIG. 1.

Initially, as noted above, the base stations 104A-C, and possibly other base stations not depicted in FIG. 1, form the ACS1 106A. Similarly, the base stations 104C-D (and possibly other base stations not depicted in FIG. 1) form the ACS2 106B. The RAN 112 may organize the base stations of the RAN 112 into ACSs in a variety of ways.

In some implementations, the UE 102 directs the formation of the ACSs in the RAN 112. To this end, the UE 102 performs measurements on signals transmitted by the base stations 104A-D, such as reference signals (e.g., a cell-specific reference signal (CRS)). The measurements can be, for example, a received signal strength indicator (RSSI), a reference signal received power (RSRP), or a reference signal received quality (RSRQ). If a measurement is above an appropriate threshold, then the UE 102 may determine that the base station that transmitted the signal is a suitable candidate for an ACS. For example, at a first time, the measurements of the UE 102 indicate that the signal quality of signals from each of the base stations 104A-C is above an appropriate threshold. The UE 102 then may send a message to the RAN 112 (e.g., by sending a request to one of the base stations 104A-C) requesting that the RAN 112 communicate with the UE 102 via the ACS1 106A. At a later time, if measurements taken by the UE 102 indicate that the base stations 104C-D are appropriate for a new ACS (e.g., when reference signals from base stations 104A and D become weaker and stronger, respectively), then the UE 102 can send a new request to the RAN 112 that the RAN 112 communicate with the UE 102 via the ACS2 106B.

In other implementations, the UE 102 may send the signal quality measurements to the RAN 112, and the RAN 112 may determine a suitable ACS for the UE 102 based on the signal quality measurements. The RAN 112 may also determine a suitable ACS for the UE 102 based on the location of the UE 102. In one such implementation, the UE 102 sends information indicative of its own location to the RAN 112, and/or the UE 102 may send information indicative of its own bearing or speed to the RAN 112 to indicate how the UE 102 is moving. The RAN 112 may predict, based on the location, bearing, and/or speed information, an ACS that will be suitable for the UE 102, either currently or at a particular future time.

In any of these implementations, if an ACS is to serve a UE, the RAN 112 assigns an identifier specific to that ACS and that UE (referred to herein as an ACS-RNTI) to the UE. Conventionally, an individual base station may use an RNTI such as a cell RNTI (referred to as a "c-RNTI") to identify downlink channels intended for an individual UE. In contrast, the techniques disclosed herein specify an ACS-RNTI that the ACS can use, in some implementations, in a similar manner as a c-RNTI. However, two or more base stations of an ACS, rather than an individual base station, utilize the ACS-RNTI to identify channels intended for the UE. Thus, in some implementations that use ACS-RNTIs, the RAN 112 and the UE 102 do not use any c-RNTIs.

To ensure that each ACS utilizes a different ACS-RNTI for each UE, the RAN 112 partitions a pool of available identifiers. In some implementations, prior to partitioning, the RAN 112 determines possible ACSs by determining possible permutations of base stations that a UE could request to make up an ACS (e.g., possible combinations of the base stations 104A-D). For example, the RAN 112 may partition the pool of available identifiers amongst ACSs that are within a threshold distance of each other (or separated by no more than a threshold number of other cells, etc.), such that neighboring ACSs will not share the same set of ACS-RNTIs. In some implementations, the RAN 112 may also partition some subsets of identifiers for use by single base stations, to ensure that ACSs and single base stations with overlapping coverage areas do not assign the same identifiers. In other implementations, ACS-RNTIs are reserved for use by sets of two or more base stations, while single base stations use a different type of RNTI (e.g., a c-RNTI) for the same purpose. Partitioning of an identifier pool by the RAN 112 is discussed below with reference to FIG. 3.

Figure 3:
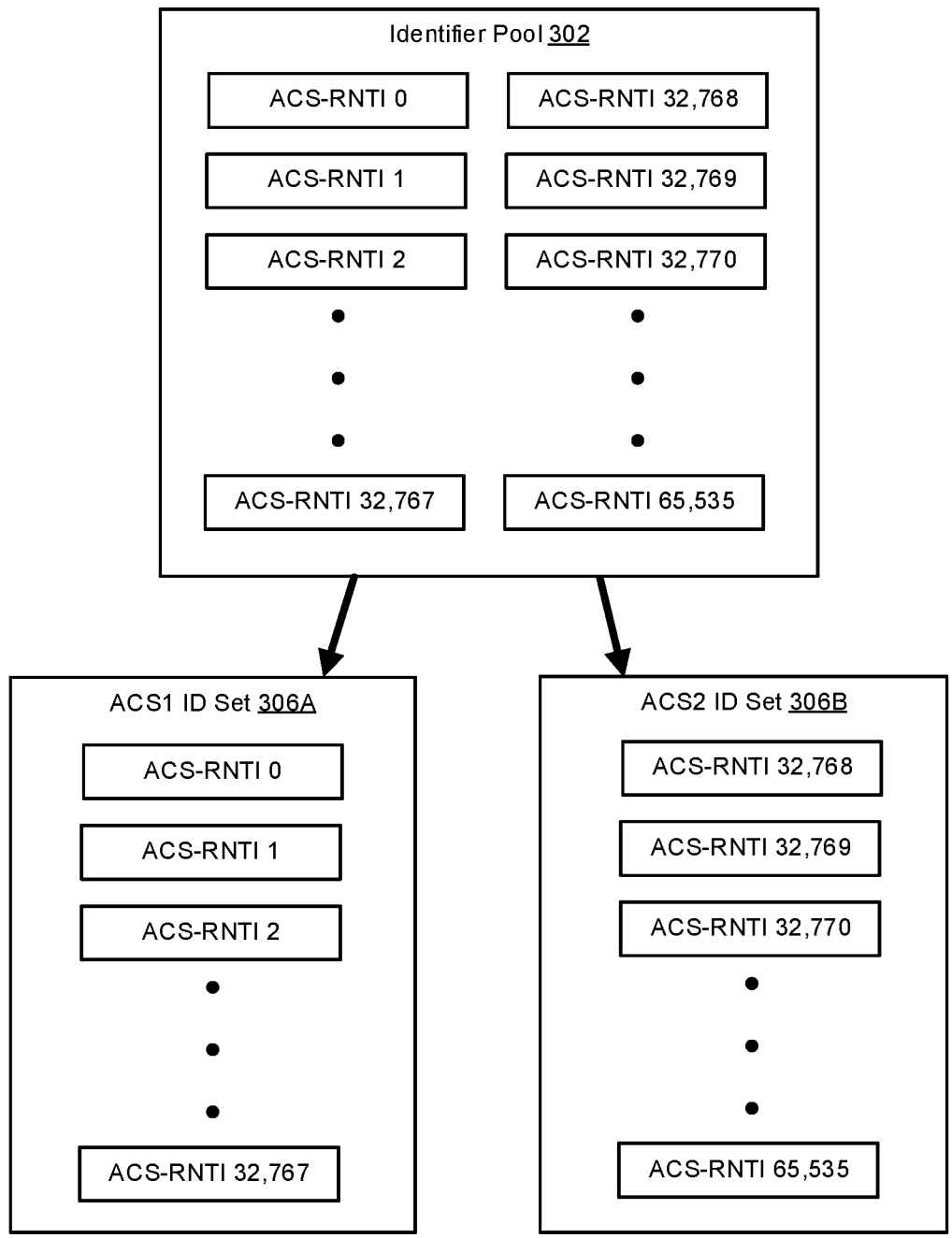
FIG. 3 depicts an example partitioning, by a RAN, of an identifier pool into different identifier sets associated with different ACSs of the RAN.

FIG. 3 depicts an example partitioning by the RAN 112 of an ACS identifier pool 302 into different identifier sets associated with different ACSs of the RAN 112. The base stations (e.g., the base stations 104A-D) can coordinate with each other to partition the ACS identifier pool 302. In the example embodiment depicted in FIG. 3, each ACS identifier is an ACS-RNTI, and each ACS-RNTI is a 16-bit identifier. It is understood that in other embodiments, the length of the ACS-RNTI can be different. A 16-bit identifier corresponding to an unsigned integer, for example, can be any one of $2^{16}$ values ranging from 0 to 65,535 (i.e., $2^{16}-1$). Thus, the ACS identifier pool 302 has $2^{16}$ ACS-RNTIs (e.g., ACS-RNTI 0, ACS-RNTI 1, . . . , ACS-RNTI 65,535) available to be assigned to an ACS and in turn assigned to a UE served by the ACS.

In FIG. 3, the RAN 112 partitions the ACS identifier pool 302 into two ACS identifier sets: ACS identifier set 1 (ACS1 ID set) 306A corresponding to the ACS1 106A, and ACS identifier set 2 (ACS2 ID set) 306B corresponding to the ACS 106B. The RAN 112 partitions the identifier pool 302 such that the ACS1 ID set 306A and the ACS2 ID set are non-overlapping, i.e., the ACS1 ID set 306A does not share any ACS-RNTIs with the ACS2 ID set 306B. In the example shown in FIG. 3, the ACS1 ID set 306A includes ACS-RNTIs 0-32,767 and the ACS2 ID set 306B includes ACS-RNTIs 32,768-65,535. The RAN 112 may partition the ACS identifier pool 302 in a semi-static manner.

In some implementations and/or scenarios, the RAN 112 does not partition the entire ACS identifier pool 302. For example, the RAN 112 can partition only a portion of the possible ACS-RNTIs in the identifier pool 302 into ACS identifier sets. The RAN 112 may partition the ACS identifier pool 302 into as many identifier sets as needed such that no ACSs with overlapping cells or within a predetermined distance of each other share any ACS-RNTIs. For each UE that is to be served by the ACS, the RAN 112 selects an ACS-RNTI from the identifier set associated with the ACS and assigns the selected ACS-RNTI to the UE. The ACS-RNTI can be a PHY layer 232 identifier, or may be an identifier at a layer above the PHY layer, such as the MAC layer 234. If the ACS-RNTI is a PHY layer 232 identifier, then the functions of the controllers 132, 152 may occur at the PHY layer 232.

For simplicity, FIG. 1 depicts two ACSs 106A-B and FIG. 3 depicts partitioning the identifier pool 302 into two identifier sets 306A-B associated with ACS1 106A and ACS2 106B, respectively. However, as mentioned, the RAN 112 may partition the identifier pool 302 into more than two identifier sets in accordance with the number of possible ACSs in the RAN 112. For example, the RAN 112 can determine that possible ACSs include: base stations 104A-D; base stations 104A-C (i.e., the ACS 106A); base stations 104B-D; base stations 104A, C, D; base stations 104A, B, D; base stations 104A-B; base stations 104A, C; base stations 104B, C; base stations 104A, D; and base stations 104C-D (i.e., the ACS 106B). The RAN 112 may partition the identifier pool 302 into 10 identifier sets corresponding to these 10 possible ACSs. In this way, the RAN 112 can prepare to serve the UE 102 using any of the possible ACSs in the RAN 112. In some implementations, the RAN 112 also partitions sets of the identifier pool 302 for the individual base stations 104A-D, resulting in 14 identifier sets, in this example. Also, the RAN 112 may repartition the identifier pool 302 based on historical information. For example, the RAN 112 can repartition to provide more identifiers for ACS1 ID set 306A than ACS2 ID set 306B due to historically more UEs operating simultaneously with ACS1 106A than ACS2 106B.

FIGS. 4-5 illustrate message sequences between the UE 102 and the RAN 112 (including the ACSs 106A and 106B), for a number of scenarios and implementations related to managing and utilizing ACS-RNTIs. The ACS1 106A includes the base stations 104A, 104B, and 104C, and the ACS2 106B includes the base stations 104C and 104D. The base station 104C operates as part of both the ACS1 106A and the ACS2 106B, as illustrated by the overlapping ACS1 106A and ACS2 106B boxes in FIGS. 4-5. While FIGS. 4-5 and the accompanying descriptions refer to specifically to the UE 102, the RAN 112, and the ACSs 106A-B of FIG. 1, it is understood that the following techniques may be implemented by other components and/or in systems other than the communication system 100 of FIG. 1.

Figure 4A:
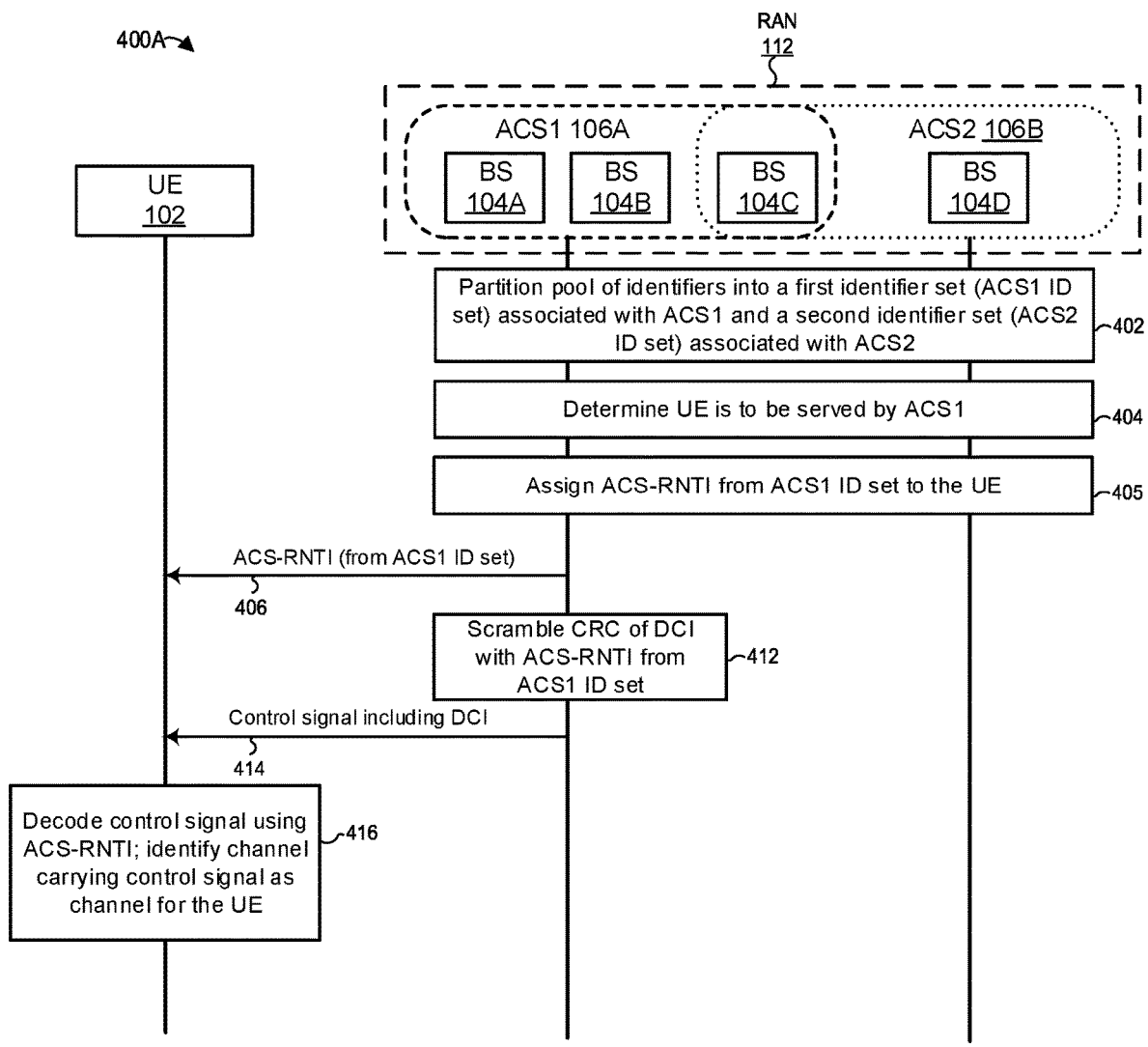
FIG. 4A is a messaging diagram of an example scenario in which a RAN transmits an ACS identifier to a UE, and the UE uses the ACS identifier to decode a control signal.

Referring first to FIG. 4A, in a scenario 400A, the RAN 112 transmits an ACS-RNTI to the UE 102, and the UE 102 uses the ACS-RNTI to decode a control signal. The example scenario 400A begins when the RAN 112 partitions 402 a pool of identifiers (such as the ACS identifier pool 302) into a first identifier set (i.e., an ACS1 ID set, such as the ACS1 ID set 306A) associated with the ACS1 106A and a second identifier set (i.e., an ACS2 ID set, such as the ACS2 ID set 306B) associated with the ACS2 106B, and possibly also other identifier sets (for additional ACSs, for potential future ACSs, and/or, in some implementations, for single base stations). The RAN 112 may partition the pool of identifiers as described above with reference to FIG. 3. In addition, the RAN 112 may use the X2/Xn interfaces 116A-D to distribute the first identifier set (or a portion of the first identifier set) to the base stations 104A-C of the ACS1 106A and the second identifier set (or a portion of the second identifier set) to the base stations 104C-D of the ACS2 106B.

Next, in the depicted scenario 400A, the RAN 112 determines 404 that the UE 102 is to be served by the ACS1 106A. As discussed above, the RAN 112 may make this determination in a variety of ways. In some implementations, the RAN 112 receives a message from the UE 102 requesting that the ACS1 106A serve the UE 102. One or more of the base stations 104A-D and/or other base stations of the RAN 112 may receive the request. The UE 102 may transmit such a request in response to detecting signal quality measurements indicating that the UE 102 is receiving strong signals from the base stations 104A-C, for example. Based on the request, the RAN 112 determines 404 that the UE 102 is to be served by the ACS1 106A. In other implementations, as discussed above, the RAN 112 may not receive a request from the UE 102. In these implementations, the RAN 112 may determine 404 that the UE 102 is to be served by the ACS1 106A based on a location of the UE 102 (e.g., if the UE 102 is located within or near cells 124A-C) and/or a bearing or velocity of the UE 102 (e.g., if the UE 102 is moving towards cells 124A-C). The RAN 112 may receive location, bearing, and velocity information from the UE 102. The RAN 112 may also determine 404 that the ACS1 106A is to serve the UE 102 based on signal quality measurements from the UE 102 indicating that the UE 102 is receiving strong signals from the base stations 104A-C.

In response to determining 404 that the ACS1 106A should serve the UE 102, the RAN 112 (e.g., the base stations 104A-C of the ACS1 106A, the base stations 104A-D of the ACSs 106A-B, or one or more master base stations) assigns 405 an ACS-RNTI from the ACS1 ID set to the UE 102. The base stations 104A-C, or a master base station of the ACS1 106A, may distribute the assigned ACS-RNTI, or an indication of which ACS-RNTI of the ACS1 ID set was assigned to the UE 102, within the ACS1 106A using the X2/Xn interfaces 116A-B. The RAN 112 then transmits 406 the ACS-RNTI selected from the ACS1 ID set to the UE 102, so that the UE 102 is aware of the ACS-RNTI and can utilize the ACS-RNTI. In some implementations and/or scenarios, as depicted in FIG. 4A, the base stations 104A-C of the ACS1 106A jointly transmit 406 the ACS-RNTI from the ACS1 ID set to the UE 102. In other implementations and/or scenarios (e.g., if the downlink channel quality is very poor for two of the base stations in ACS1 106A), a single base station 104A, 104B, or 104C of the ACS1 106A transmits 406 the ACS-RNTI.

When the ACS1 106A has control information to deliver to the UE 102, the ACS1 106A (e.g., a master base station of base stations 104A-C) generates a control signal for the UE 102. The control signal may include, for example, downlink control information (DCI), which specifies time and frequency resources that the UE 102 can use to transmit data on an uplink data channel (e.g., a physical uplink shared channel (PUSCH)) and to receive data on a downlink data channel (e.g., a physical downlink shared channel (PDSCH)). As a part of generating the control signal, the ACS1 106A scrambles 412 a cyclic redundancy check (CRC) for the DCI using the ACS-RNTI, and includes the scrambled CRC with the DCI in the control signal. As one example, if the ACS-RNTI assigned to the UE 102 has been distributed within the ACS1 106A, a master base station of the ACS1 106A can distribute control information to at least one other base station of the ACS1 106A using the X2/Xn interfaces 116A-B. The master base station, and the base stations of the ACS1 106A that have received the control information, can each scramble a CRC using the ACS-RNTI and each generate a control signal including the scrambled CRC. Alternatively, a master base station of the ACS1 106A can scramble a CRC using the ACS-RNTI and distribute the control signal including the already-scrambled CRC within the ACS1 106A. A UE that uses that ACS-RNTI can "de-scramble" the CRC and therefore decode the DCI.

The ACS1 106A transmits 414 the control signal including the DCI and scrambled CRC to the UE 102 on a control channel (e.g., a Physical Downlink Control Channel (PDCCH)). In the manner discussed above, the base stations 104A-C of the ACS1 106A can jointly transmit 414 the control signal to the UE 102 (i.e., each base station 104A-C or a subset of the base stations 104A-C can transmit a control signal including the DCI and scrambled CRC). The UE 102 aggregates the received signals from the base stations 104A-C to obtain a stronger combined signal. The UE 102 can then decode 416 the DCI by using the ACS-RNTI to de-scramble the CRC of the combined signal. If the UE 102 successfully decodes 416 the DCI, the UE 102 identifies the control channel carrying the control signal as a channel carrying control information for the UE 102 from the ACS1 106A.

While not depicted in FIG. 4A, it should be understood that the ACS1 106A may also send data signals to the UE 102 (e.g., using resources indicated by the DCI). In a manner similar to event 412, when generating a data signal for the UE 102, the ACS1 106A (e.g., a master base station of the base stations 104A-C) scrambles a CRC for the data using the ACS-RNTI, and includes the scrambled CRC with the data in the data signal. Likewise, similar to event 414, the ACS1 106A can use the X2/Xn interfaces 116A-B to distribute the data signal within the ACS1 106A and then jointly transmit the data signal to the UE 102 on a data channel, such as a PDSCH. The UE 102 can, similar to event 416, can aggregate the received data signals and decode the data using the ACS-RNTI to de-scramble the CRC. If the UE 102 successfully decodes the data, the UE 102 identifies the data channel carrying the data signal as a channel carrying data for the UE 102. Thus, while data signals are not specifically depicted in FIGS. 4-5, it should be understood that the UE 102 may identify a channel carrying data for the UE 102 using techniques similar to those the UE 102 uses to identify a channel carrying control information for the UE 102.

Figure 4B:
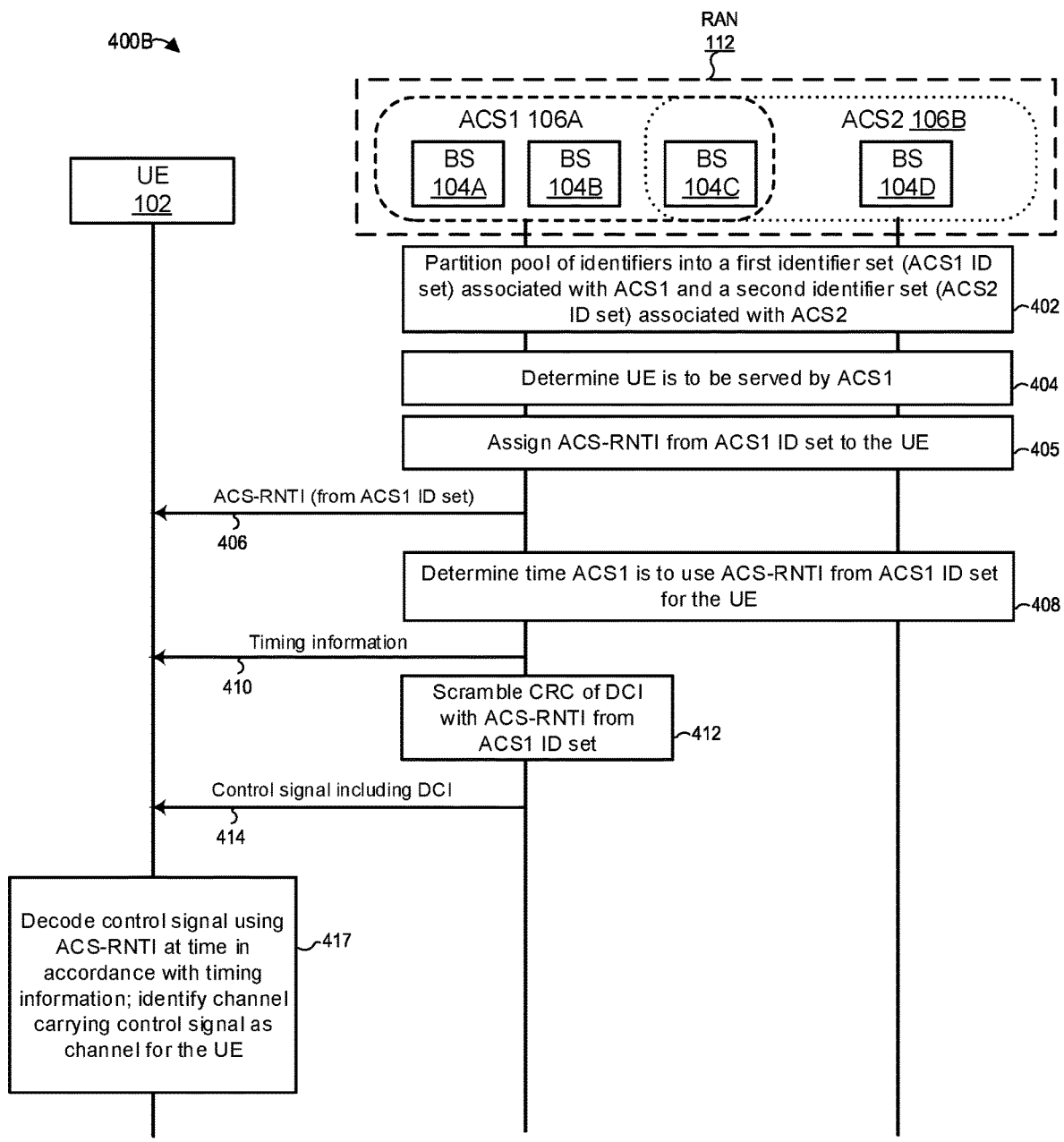
FIG. 4B is a messaging diagram of an example scenario similar to the scenario of FIG. 4A, but in which the RAN also transmits timing information to the UE indicating when the UE is to use the ACS identifier.

FIG. 4B illustrates a scenario 400B similar to the scenario 400A of FIG. 4A, but in which the RAN 112 also transmits timing information to the UE 102 indicating when the UE 102 is to use the ACS-RNTI. As in FIG. 4A, the RAN 112 partitions 402 a pool of identifiers into at least an ACS1 ID set and an ACS2 ID set associated with the ACS1 106A and the ACS2 106B, respectively. In the depicted scenario 400B, the RAN 112 determines 404 that the UE 102 is to be served by the ACS1 106A, and in response assigns 405 an ACS-RNTI from the ACS1 ID set to the UE 102. The ACS1 106A then transmits 406 the ACS-RNTI, which was selected from the ACS1 ID set, to the UE 102.

In addition, the RAN 112 determines 408 a time that the ACS1 106A is to use the ACS-RNTI from the ACS1 ID set to identify a channel for the UE 102 (e.g., by scrambling a CRC included in a signal for the UE 102 with the ACS-RNTI). By communicating via the interfaces 116A-D, the base stations 104A-C of the ACS1 106A can coordinate with each other, and with the base stations 104C-D of the ACS2 106B, on the starting time of when the ACS-RNTI will be used. The time may be based on the location, bearing, and/or speed of the UE 102 and/or signal quality measurements performed by the UE 102 indicating when the UE 102 is predicted to receive strong signals from the ACS1 106A, for example. In some implementations, the time can be based on capability information the RAN 112 receives from the UE 102, as will be discussed below with reference to FIG. 5D. The ACS1 106A then transmits 410 to the UE 102 the timing information indicating when the ACS1 106A will use the ACS-RNTI to indicate a channel for the UE 102 (e.g., by scrambling a CRC as discussed above). The ACS1 106A can, for example, transmit 410 the timing information in a radio resource control (RRC) message. The message may indicate the time as a frame number and a slot number within the frame, as an amount of time (e.g., in milliseconds), a RAN 112 synchronized clock time, or in another suitable manner.

In some implementations, the RAN 112 simultaneously determines 404 that the UE 102 is to be served by the ACS1 106A, assigns 405 the ACS-RNTI from the ACS1 ID set to the UE 102, and determines 408 the time the ACS1 106A is going to use the ACS-RNTI. Alternatively, the RAN 112 may determine 408 the time before the RAN 112 transmits 406 the ACS-RNTI. In some of these latter implementations, the ACS1 106A transmits 406 the ACS-RNTI and transmits 410 the timing information within the same message.

Similar to FIG. 4A, the ACS1 106A then scrambles 412 a CRC using the ACS-RNTI and includes the scrambled CRC with the DCI in a control signal that the ACS1 106A transmits 414 to the UE 102. The UE 102 can decode 417 the DCI using the ACS-RNTI at or after the time indicated in the timing information. In this way, the UE 102 can avoid expending processing resources by attempting to decode received signals using the ACS-RNTI before the time indicated by the timing information. If the UE 102 successfully decodes 417 the DCI using the ACS-RNTI, then the UE 102 identifies the control channel carrying the control signal as a channel carrying control information for the UE 102.

Referring next to FIGS. 5A-D, scenarios are shown in which the UE 102 receives different ACS-RNTIs associated with different ACSs.

Figure 5A:
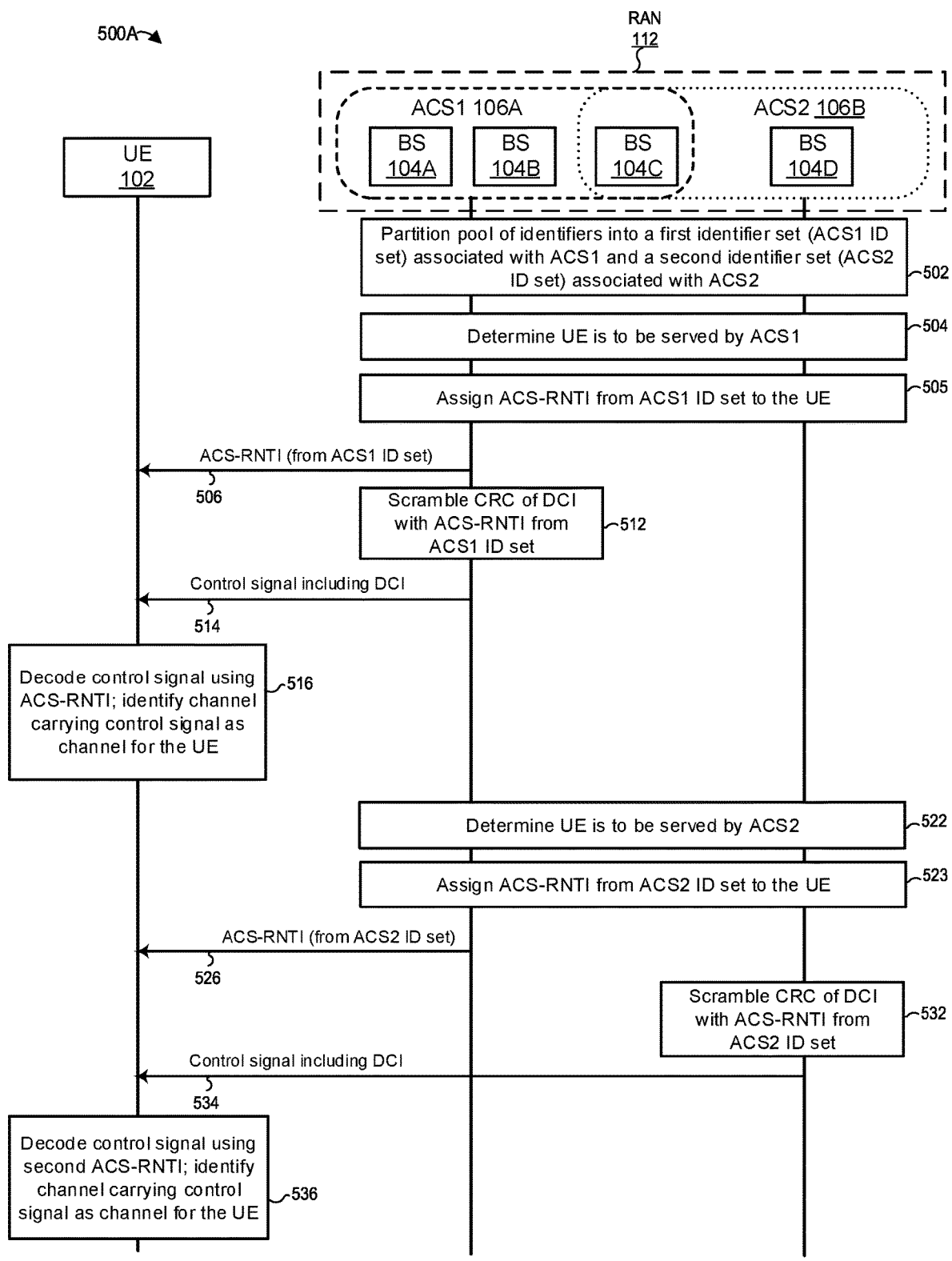
FIG. 5A is a messaging diagram of an example scenario in which a RAN transmits ACS identifiers associated with different ACSs to the UE.

FIG. 5A depicts a scenario 500A in which the UE 102 receives both a first ACS-RNTI and a second ACS-RNTI.

The scenario 500A begins with events 502, 504, 505, 506, 508, 512, 514, and 516, which may be similar to events 402, 404, 405, 406, 408, 412, 414, and 416 described with reference to FIG. 4A. However, in the scenario 500A, after using an ACS-RNTI from the ACS1 ID set 306A to identify a control channel for the UE 102, the RAN 112 determines 522 that the UE 102 is to be served by the ACS2 106B. In response, the RAN 112 assigns 523 an ACS-RNTI from the ACS2 ID set 306B to the UE 102. As discussed with reference to FIG. 4A, depending on the implementation and/or scenario, the RAN 112 can determine 522 that the UE is to be served by the ACS2 106B based on a request or other information received from the UE 102.

Next, the RAN 112 transmits 526 the second ACS-RNTI, which is selected from the ACS2 ID set, to the UE 102. In scenario 500A, the ACS1 106A transmits 526 the second ACS-RNTI to the UE 102. In other implementations and/or scenarios, the ACS2 106B can transmit the second ACS-RNTI. As discussed above with reference to event 406, the base stations 104A-C of the ACS1 106A (or the base stations 104C-D of the ACS2 106B in other scenarios) may jointly transmit 526 the ACS-RNTI.

The ACS2 106B then may generate a control signal for the UE 102 including DCI. The ACS2 106B scrambles 532 a CRC for the DCI using the ACS-RNTI from the ACS2 ID set, and includes the scrambled CRC with the DCI in the control signal. The ACS2 106B can use the X2/Xn interface 116C to distribute the control signal within the ACS2. The ACS2 106B then transmits 534 the control signal including the scrambled CRC and DCI to the UE 102. Similar to 414 and 514, the base stations 104C-D of the ACS2 106B can jointly transmit 534 the control signal to the UE 102. The UE 102 aggregates the received signals and decodes 536 the DCI by using the second ACS-RNTI to de-scramble the CRC. If the UE 102 successfully decodes 536 the DCI, then the UE identifies the control channel carrying the control signal as a channel carrying information for the UE 102 from the ACS2 106B.

In scenarios such as the scenario 500A, where the UE 102 receives two ACS-RNTIs, the UE 102 may determine when to use each ACS-RNTI in a variety of different ways. For example, in some implementations, the UE 102 uses the ACS-RNTI that the UE 102 most recently received. In other implementations, the UE 102 attempts to decode information using a first ACS-RNTI (e.g., the ACS-RNTI that the UE 102 last used successfully), and, if unsuccessful, attempt to use a different ACS-RNTI to decode the information, as discussed below with reference to FIGS. 5B. In still other implementations, the UE 102 receives timing information indicating when the RAN 112 will use a particular ACS-RNTI (which also corresponds to when the UE 102 should begin to use the particular ACS-RNTI), as discussed below with reference to FIG. 5C. Still further, the UE 102 may determine when to use an ACS-RNTI based in part on a capability message that the UE 102 sends to the RAN 112, as will be discussed with reference to FIG. 5D.

Figure 5B:
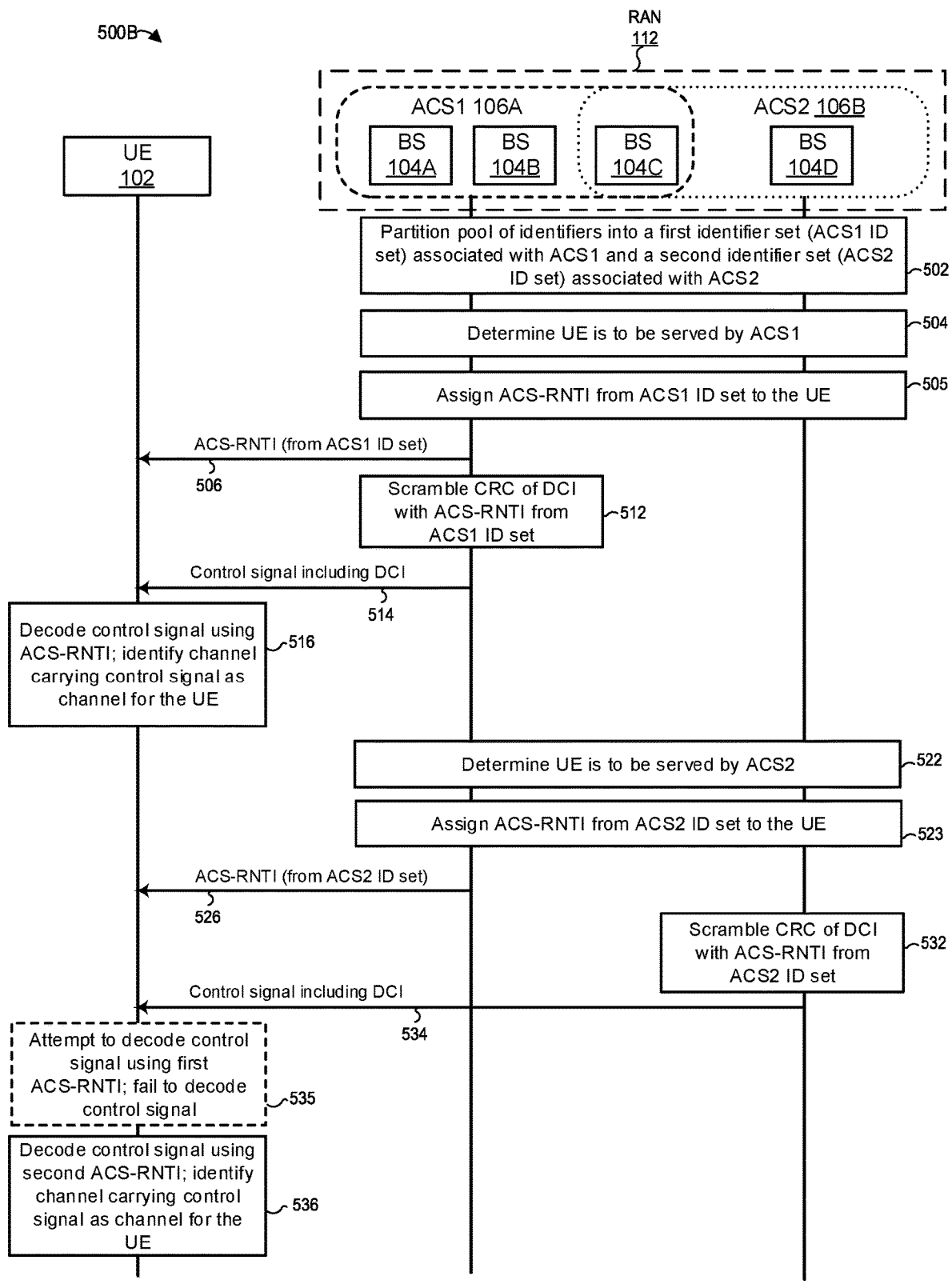
FIG. 5B is a messaging diagram of an example scenario similar to the scenario of 5A, but in which the UE attempts to identify a channel using both a first ACS identifier and a second ACS identifier.

Turning to FIG. 5B, scenario 500B is generally similar to scenario 500A. However, after receiving 534 the control signal from the ACS2 106B, the UE 102 first attempts to decode 535 the DCI using the first ACS-RNTI, which the RAN selected from the ACS1 ID set 306A. The UE 102 may be unaware that that the received control signal was transmitted by the ACS2 106B rather than the ACS1 106A, for example. In the scenario 500B, because the ACS2 106B scrambled 532 the CRC with the ACS-RNTI from the ACS2 ID set, the UE 102 fails to decode the DCI at event 535. After (e.g., in response to) failing to decode the DCI, the UE 102 attempts to decode 536 the DCI using the second ACS-RNTI, which the RAN selected from the ACS2 ID set 306B. In response to successfully decoding 536 the DCI using the second ACS-RNTI, the UE 102 identifies the control channel carrying the control signal as a channel carrying control information for the UE 102 from the ACS2 106B.

Figure 5C:
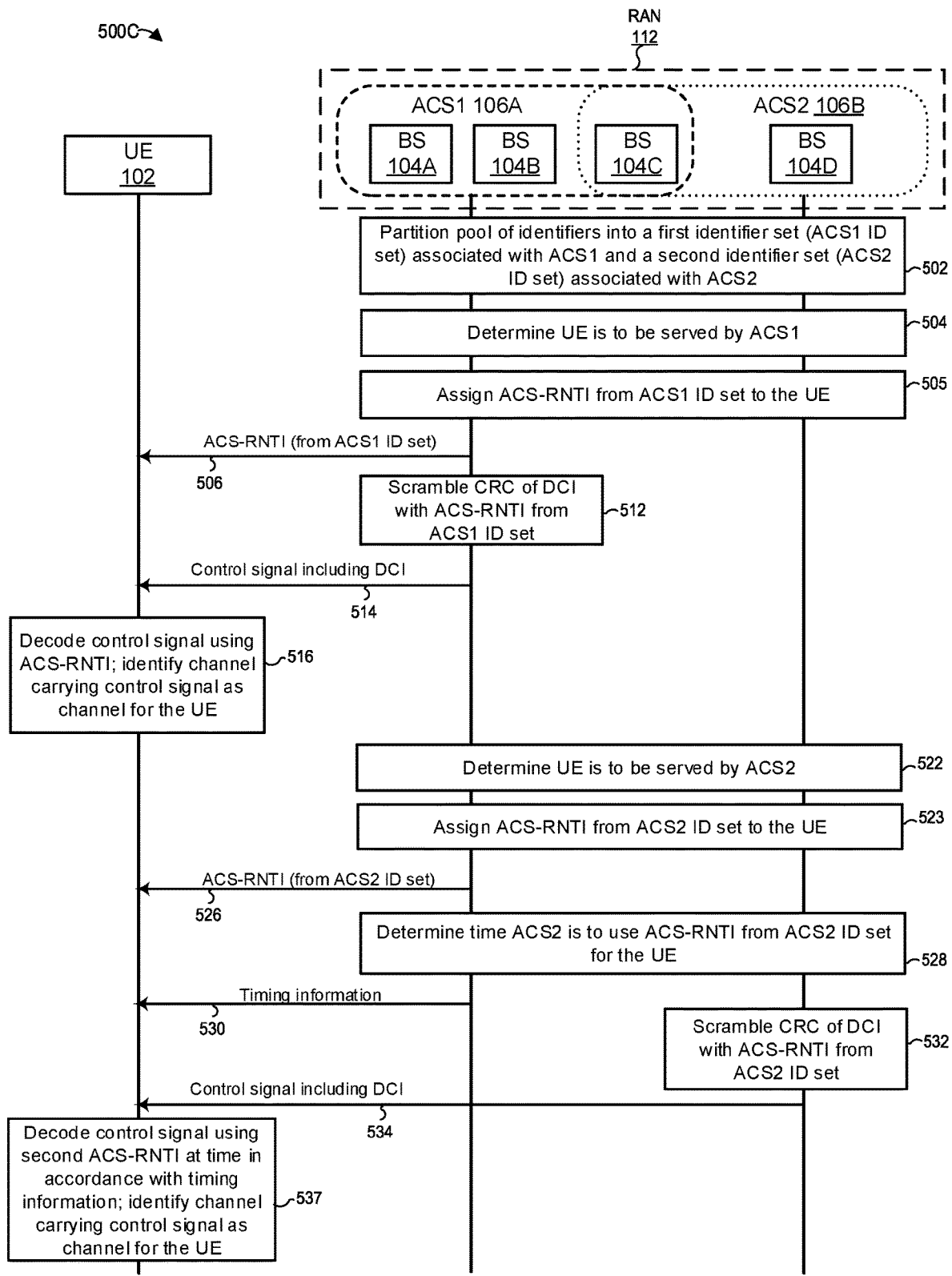
FIG. 5C is a messaging diagram of an example scenario similar to the scenario of 5A, but in which the RAN also transmits timing information to the UE indicating when the UE is to use the second ACS identifier.

FIG. 5C illustrates a scenario 500C that is generally similar to 500A, but in which the RAN 112 also transmits timing information to the UE 102 indicating when the UE 102 is to use the second ACS-RNTI, which the RAN selected from the ACS2 ID set. Similar to event 408 of FIG. 4B, the RAN 112 determines a time that the ACS2 106B will use the ACS-RNTI from the ACS2 ID set to identify a channel for the UE 102 (e.g., by scrambling a CRC included in a signal for the UE 102 with the ACS-RNTI from the ACS2 ID set). By communicating via the interfaces 116A-D, the base stations 104C-D of the ACS2 106B can coordinate with each other, and with the base stations 104A-C of the ACS1 106A, on the starting time when the ACS-RNTI will be used. The ACS1 106A then transmits 530 to the UE 102 the timing information indicating when the ACS2 106B will use the second ACS-RNTI to indicate a channel for the UE 102. The ACS1 106A can, for example, transmit 530 the timing information in a radio resource control (RRC) message. The message may indicate the time as a frame number and a slot number within the frame, as an amount of time (e.g., in milliseconds), a RAN 112 synchronized clock time, or in another suitable manner.

In addition, similar to events 404 and 408 of FIG. 4B, the RAN 112 may simultaneously determine 522 that the UE 102 is to be served by the ACS 106B, assign 523 the ACS-RNTI from the ACS2 ID set to the UE 102, and determine 528 the time the ACS2 106B is going to use the ACS-RNTI, or may instead determine 528 the time before transmitting 526 the ACS-RNTI. In the latter implementations, the ACS1 106A may transmit 526 the ACS-RNTI and transmit 530 the timing information within the same message.

If the UE 102 receives a data or control signal before the time indicated in the timing information, the UE 102 continues to use the first ACS-RNTI to decode the information in the signal. If the UE 102 receives a data or control signal at or after the time indicated in the timing information, however, the UE 102 uses the second ACS-RNTI to decode the information in the signal. If the UE 102 successfully decodes 537 the DCI using the second ACS-RNTI, at or after a time in accordance with the timing information, the UE 102 identifies 537 the control channel carrying the control signal as a channel carrying information for the UE 102 from the ACS2 106B.

Figure 5D:
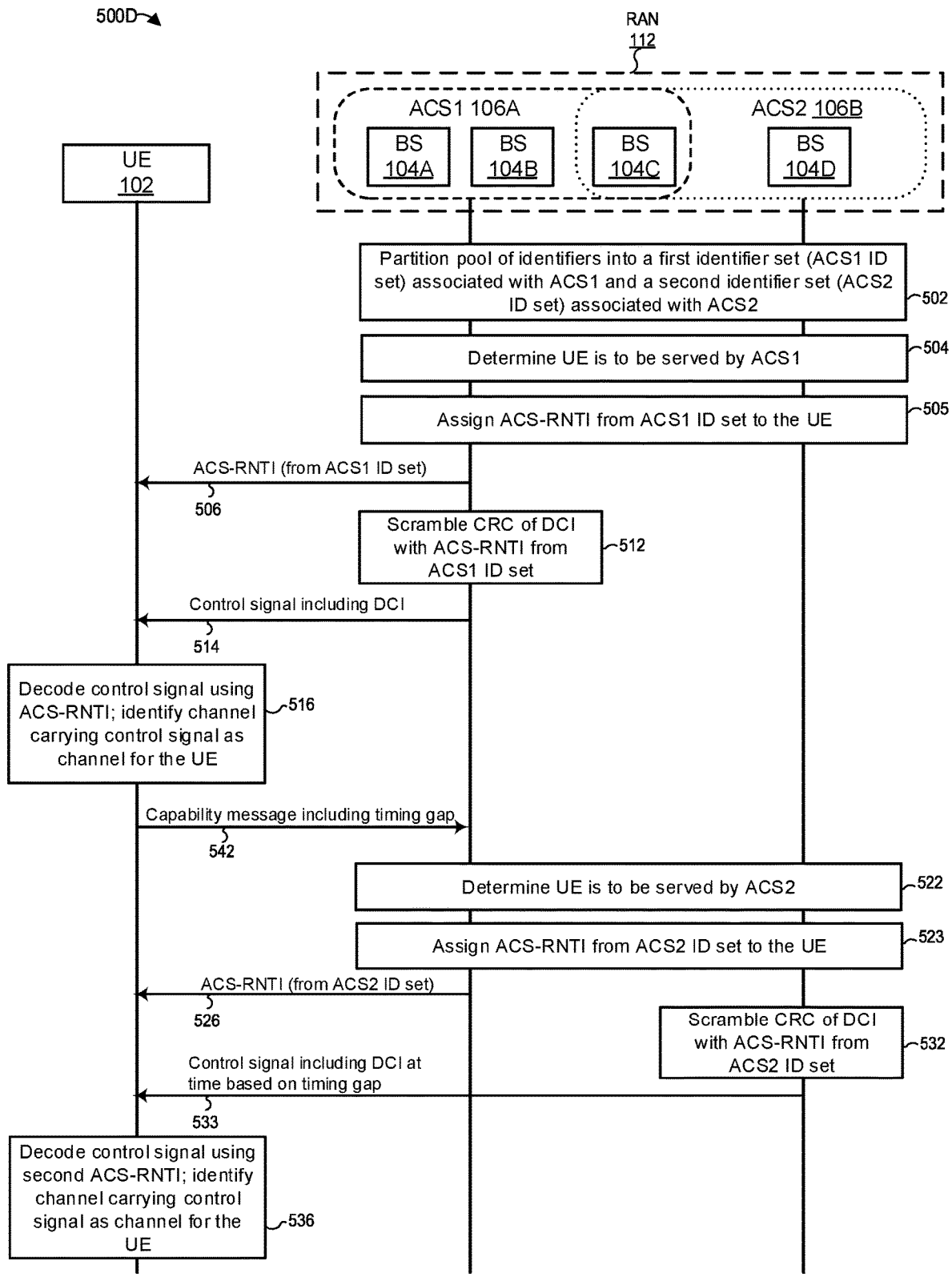
FIG. 5D is a messaging diagram of an example scenario similar to the scenario of 5A, but in which the UE transmits a capability message to the RAN.

FIG. 5D illustrates a scenario 500D generally similar to the scenario 500A, except that the UE 102 transmits a capability message to the RAN 112. In particular, due to hardware constraints, the UE 102 may not be able to use a new ACS-RNTI immediately after receiving the ACS-RNTI. That is, the UE 102 may require time to configure itself to utilize a new ACS-RNTI. The timing gap between when the UE 102 receives a new ACS-RNTI and when the UE 102 is capable of using the new ACS-RNTI may be a predetermined value specific to the particular UE 102 or to the type of the UE 102. To inform the RAN 112 of this timing gap, the UE 102 transmits 542 a capability message indicating the timing gap to the ACS1 106A. Each of the base stations 104A-C can receive 542 the capability message, or one of the base stations 104A, 104B, or 104C can receive 542 the capability message and share the timing gap information with the other base stations of the ACS1 106A using the interfaces 116A-B. The ACS1 106A can also share the timing gap information with other elements of the RAN 112, including the ACS2 106B, using one or more of the interfaces 116A-D or 114A-D.

When the RAN 112 receives 542 the capability message including the timing gap, the RAN 112 can adjust its utilization times accordingly. In scenario 500D, for example, the ACS2 106B can wait to scramble 532 the CRC with the ACS-RNTI from the ACS2 ID set (or at least wait to transmit 533 the control signal) until a time that is later than the transmission 526 by at least the timing gap. As a further example, the RAN 112 may determine a time when the ACS-RNTI from the ACS2 ID set will be used (similar to event 408 of FIG. 4B or event 528 of FIG. 5C) based in part on the timing gap, and transmit timing information indicating the time to the UE 102 (similar to event 410 of FIG. 4B or event 530 of FIG. 5C). After the UE 102 receives 533 the control signal, the UE 102 can decode 536 the DCI using the second ACS-RNTI and identify 536 that the channel carrying the control signal is a channel for the UE 102.

Figure 6:
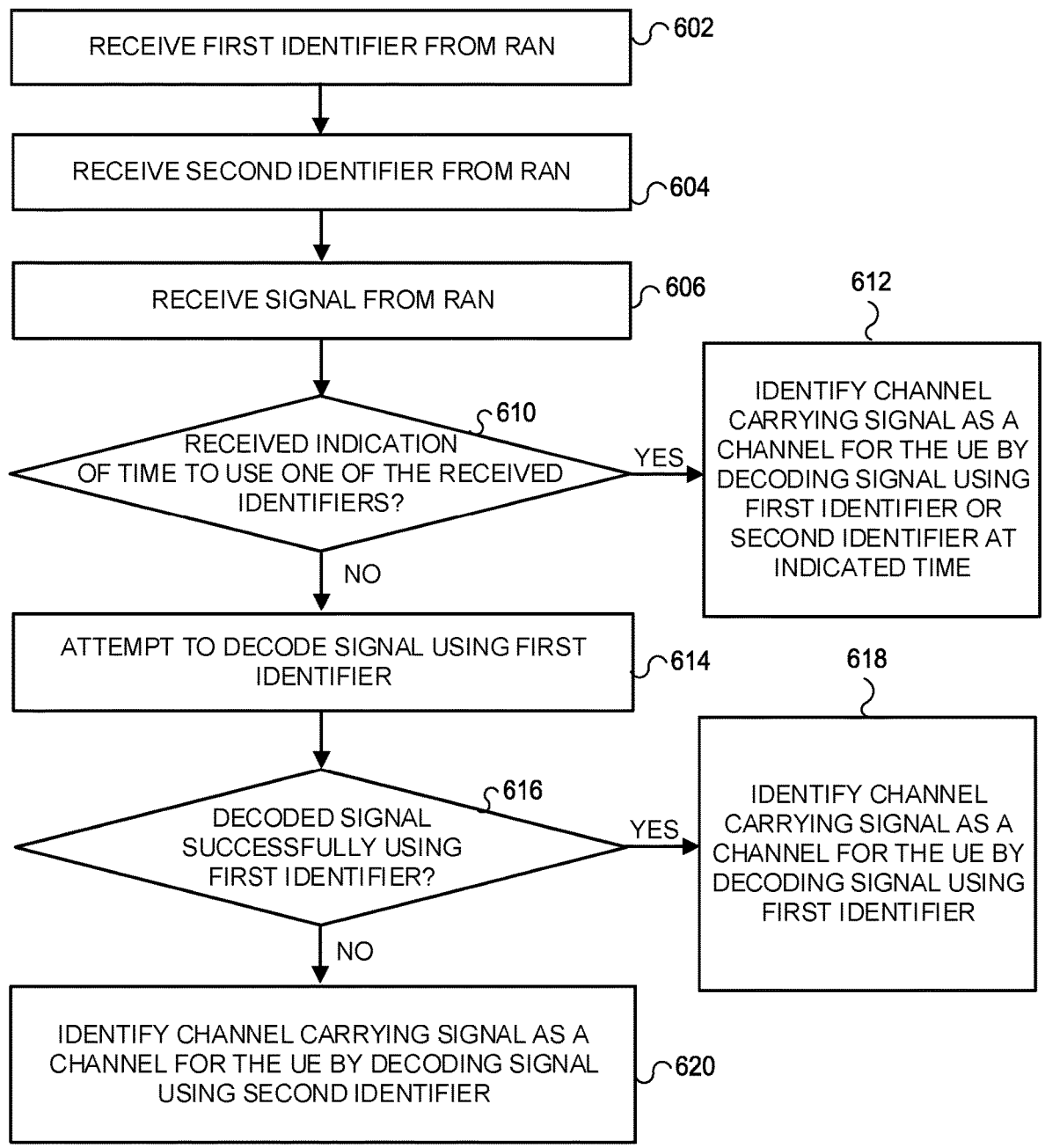
FIG. 6 is a flow diagram of an example algorithm for identifying a channel carrying information for a UE using a first ACS identifier or a second ACS identifier, which can be implemented in a UE of this disclosure.

Referring now to FIG. 6, a UE may rely on a combination of the techniques discussed above to identify a control or data channel carrying information for the UE from a RAN. In some situations, the RAN is represented by a base station that serves the UE as part of a first ACS and later serves the UE as part of a second ACS. The method 600 begins at block 602, when the UE receives a first identifier (e.g., an ACS-RNTI the RAN selected from an ACS1 ID set associated with the ACS1 106A) from the RAN (e.g., event 406 of FIGS. 4A-B and event 506 of FIGS. 5A-D). More particularly, the UE may receive the first identifier from an ACS with multiple base stations of the RAN (e.g., ACS1 106A or ACS2 106B). At block 604, the UE receives a second identifier (e.g., an ACS-RNTI the RAN selected from an ACS2 ID set associated with the ACS2 106B) from the RAN (e.g., event 526 of FIGS. 5A-D). The UE may receive the second identifier from an ACS of the RAN (e.g., ACS1 106A or ACS2 106B). The UE may receive the first and second identifiers from the same ACS or from different ACSs.

Next, at block 606, the UE receives a signal from the RAN, which may be a control signal or a data signal (e.g., event 414 of FIGS. 4A-B, events 514 and 534 of FIGS. 5A-D). The RAN may transmit the signal via an ACS that transmitted either the first or the second identifier, or via a different ACS. At block 610, the UE determines whether the UE has received an indication of a time to use one of the received identifiers (e.g., event 410 of FIG. 4B, event 530 of FIG. 5C). If so, the flow proceeds to block 614. If not, the flow proceeds to block 612.

At block 612, the UE identifies the channel carrying the signal as a channel for the UE using either the first identifier or the second identifier at the indicated time (e.g., event 417 of FIG. 4B, event 537 of FIG. 5C). For instance, if the UE has received timing information indicating that the UE is to use the second identifier at time $t_2$, then if the UE receives the signal at time $t_1$ before time $t_2$ (i.e., $t_1 < t_2$), then the UE can use the first identifier to identify the channel. If the UE receives the signal at time $t_3$ after time $t_2$, (i.e., $t_3 > t_2$), then the UE can use the second identifier to identify the channel.

At block 610, the UE attempts to decode the signal using the first identifier (e.g., event 416 of FIGS. 4A, event 516 of FIGS. 5A-D, event 535 of FIG. 5B). At block 616, the UE determines whether the UE decoded the signal successfully using the first identifier. If so, the flow proceeds to block 618. If not, the flow proceeds to block 620.

At block 618, the UE identifies the channel carrying the signal as a channel for the UE by decoding the signal using the first identifier (e.g., event 416 of FIG. 4A, event 516 of FIG. 5B). Correspondingly, at block 620, the UE identifies the channel carrying the signal as a channel for the UE by decoding the signal using the second identifier (e.g., event 536 of FIG. 5B).

In some implementations, after block 606, the UE may not perform blocks 610-616. Instead, the UE may use the most recently-received identifier (i.e., the second identifier) without determining whether the UE has received timing information and without attempting to decode the signal using the first identifier. In addition, in some implementations, the UE may not perform block 610. Instead, the UE may attempt to decode the signal using the first identifier without first determining if the UE has received timing information.

Figure 7:
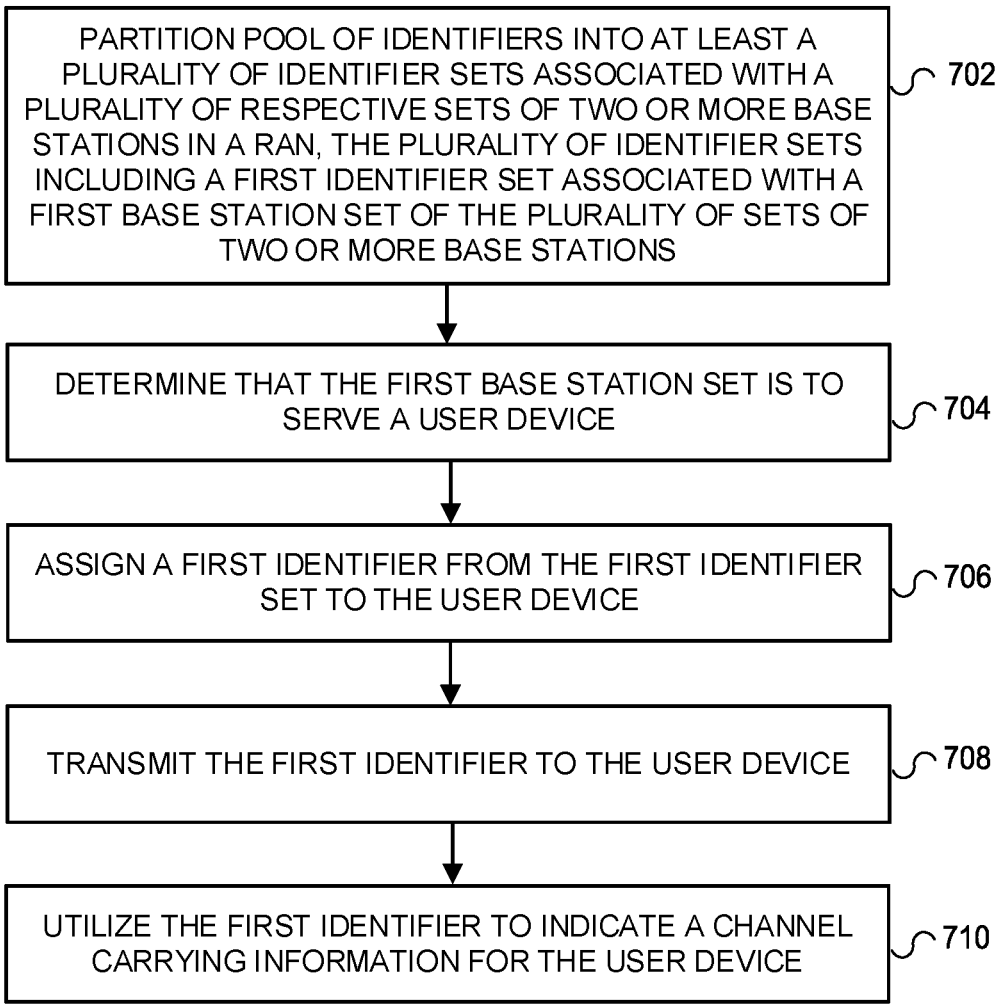
FIG. 7 is a flow diagram of an example method for improving network efficiency, which can be implemented in a RAN of this disclosure.

FIG. 7 is a flow diagram depicting an example method 700, implemented in a RAN (e.g., the RAN 112) for improving network efficiency using the techniques disclosed herein. At block 702, the RAN partitions a pool of identifiers (e.g., the pool 302 of FIG. 3) into at least a plurality of identifier sets (e.g., the ACS1 ID set 306, and the ACS2 ID set 306B of FIG. 3) associated with a plurality of respective sets of two or more base stations (e.g., the base stations 104A-D) in the RAN (e.g., event 402 of FIGS. 4A-B; event 502 of FIGS. 5A-D). The plurality of identifier sets includes at least a first identifier set (e.g., the ACS1 ID set 306A) associated with a first base station set (e.g., the ACS1 106A) of the plurality of base station sets.

At block 704, the RAN determines that the first base station set is to serve a user device (such as the UE 102) (e.g., event 404 of FIGS. 4A-B, event 504 of FIGS. 5A-D). Next, at block 706, the RAN assigns a first identifier (e.g., an ACS-RNTI) from the first identifier set to the user device (e.g., event 405 of FIGS. 4A-B, event 505 of FIGS. 5A-D).

At block 708, the RAN transmits the first identifier to the user device (e.g., event 406 of FIGS. 4A-B, event 506 of FIGS. 5A-D). At block 710, the RAN utilizes the first identifier to indicate a channel carrying information for the user device (e.g., events 412-414 of FIGS. 4A-B, event 512-514 of FIGS. 5A-B).

Figure 8:
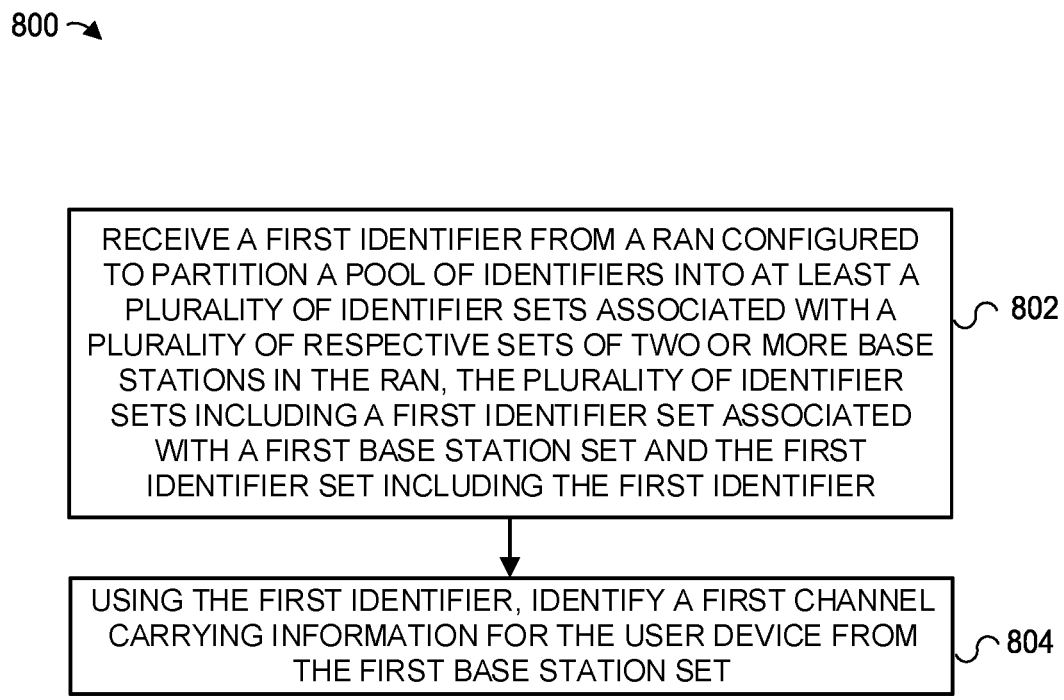
FIG. 8 is a flow diagram of an example method for improving network efficiency, which can be implemented in a UE of this disclosure.

FIG. 8 is a flow diagram depicting an example method 800, implemented in a user device (e.g., the UE 102) for improving network efficiency using the techniques disclosed herein. At block 802, the UE receives a first identifier (e.g., an ACS-RNTI) from a RAN (e.g., the RAN 112) configured to partition a pool of identifiers (e.g., the pool 302 of FIG. 3) into at least a plurality of identifier sets (e.g., the ACS1 ID set 306, and the ACS2 ID set 306B of FIG. 3) associated with a plurality of respective sets of two or more base stations (e.g., the base stations 104A-D) in the RAN (e.g., event 406 of FIGS. 4A-B; event 506 of FIGS. 5A-D). In some situations, the RAN is represented by a base station that serves the UE as part of a first base station set and later serves the UE as part of a second base station set. The plurality of identifier sets include at least a first identifier set (e.g., the ACS1 ID set 306A) associated with a first base station set (e.g., the ACS1 106A) of the plurality of sets of two or more base stations, and the first identifier set includes the first identifier.

At block 804, the UE uses the first identifier to identify a first channel carrying information for the user device from the first base station set (e.g., event 416 of FIG. 4A, event 417 of FIG. 4B, event 516 of FIGS. 5A-D).

The following list of examples reflects a variety of the embodiments explicitly contemplated by the present disclosure:

Example 1—A method in a radio access network (RAN), the method comprising: partitioning, by processing hardware of the RAN, a pool of identifiers into at least a plurality of identifier sets associated with a plurality of respective sets of two or more base stations in the RAN, the plurality of identifier sets including a first identifier set associated with a first base station set of the plurality of respective sets of two or more base stations; determining, by the processing hardware, that the first base station set is to serve a user device; assigning, by the processing hardware, a first identifier from the first identifier set to the user device; transmitting the first identifier to the user device; and using, by the first base station set, the first identifier to indicate a channel carrying information for the user device.

Example 2—The method of example 1, wherein transmitting the first identifier comprises: transmitting the first identifier to the user device by the first base station set.

Example 3—The method of any one of examples 1-2, wherein the pool of identifiers includes physical (PHY) layer identifiers.

Example 4—The method of any one of examples 1-2, wherein the pool of identifiers includes identifiers at a layer above a physical (PHY) layer.

Example 5—The method of any one of examples 1-4, wherein using the first identifier to indicate the channel includes: scrambling a cyclic redundancy check (CRC) associated with the information using the first identifier.

Example 6—The method of example 5, wherein using the first identifier to indicate the channel further includes: transmitting a signal including the scrambled CRC and the information to the user device via the channel.

Example 7—The method of any one of examples 1-6, wherein the plurality of identifier sets includes a second identifier set associated with a second base station set of the plurality of respective sets of two or more base stations, and the method further comprising: determining, by the processing hardware, that the second base station set is to serve the user device; assigning, by the processing hardware, a second identifier from the second identifier set to the user device; and transmitting the second identifier to the user device.

Example 8—The method of example 7, wherein determining that the second base station set is to serve the user device is based at least in part on a location of the user device.

Example 9—The method of example 8, further comprising: receiving an indication of the location of the user device from the user device; and determining the location of the user device based on the indication.

Example 10—The method of example 9, wherein the indication of the location is a first indication, and wherein the method further comprises: receiving from the user device a second indication of at least one of a bearing of the user device or a speed of the user device, wherein determining the location is further based on the second indication.

Example 11—The method of example 8, further comprising: receiving signal quality measurements from the user device; and determining the location of the user device based on the signal quality measurements.

Example 12—The method of any one of examples 7-11, further comprising: receiving from the user device a request that the second base station set serve the user device, wherein determining that the second base station set is to serve the user device is based at least in part on the request.

Example 13—The method of any one of examples 7-12, further comprising: receiving from the user device signal quality measurements of signals transmitted by the second base station set, wherein determining that the second base station set is to serve the user device is based at least in part on the signal quality measurements.

Example 14—The method of any one of examples 7-13, transmitting the second identifier comprises transmitting the second identifier by the first base station set.

Example 15—The method of any one of examples 7-13, wherein transmitting the second identifier comprises transmitting the second identifier by the second base station set.

Example 16—The method of any one of examples 7-15, wherein the channel is a first channel, and wherein the method further comprises: using, by the second base station set, the second identifier to indicate a second channel carrying additional information for the user device.

Example 17—The method of example 16, wherein using the second identifier to indicate the second channel includes: scrambling a cyclic redundancy check (CRC) associated with the additional information using the second identifier.

Example 18—The method of example 17, wherein using the second identifier to indicate the second channel includes: transmitting a signal including the scrambled CRC and the additional information to the user device via the second channel.

Example 19—The method of any one of examples 1-18, further comprising: determining, by the processing hardware, a time the first base station set will use the first identifier to indicate the channel; and transmitting, to the user device, timing information indicating the time the first base station set will use the first identifier.

Example 20—The method of example 19, wherein transmitting the timing information to the user device comprises transmitting a radio resource control (RRC) message including the timing information.

Example 21—The method of any one of examples 19-20, wherein the timing information indicates the time the first base station set will use the first identifier as a number of a frame and a number of a slot within the frame.

Example 22—The method of any one of examples 19-21, wherein transmitting the first identifier and transmitting the timing information comprise transmitting the first identifier and the timing information in a same message.

Example 23—The method of any one of examples 1-22, further comprising: receiving, from the user device, a capability message indicating a timing gap between a time when the user device receives a new identifier and a time when the user device is capable of using the new identifier, wherein transmitting the first identifier includes transmitting the first identifier at a first time, and wherein using the first identifier includes using the first identifier at a second time that is later than the first time by at least the timing gap.

Example 24—The method of example 23, wherein the capability message indicates the timing gap as a number of orthogonal frequency-division multiplexing (OFDM) symbols or slots.

Example 25—The method of example 1, further comprising: distributing, by a master base station of the first base station set, the first identifier to at least one other base station of the first base station set.

Example 26—The method of example 25, wherein transmitting the first identifier to the user device includes: jointly transmitting, by the master base station and the at least one other base station, the first identifier to the user device.

Example 27—The method of any one of examples 25-26, wherein using the first identifier to indicate the channel includes: scrambling, by each of the master base station and the at least one other base station, a cyclic redundancy check (CRC) associated with the information using the first identifier; and jointly transmitting, by the master base station and the at least one other base station, a signal including the scrambled CRC and the information to the user device via the channel.

Example 28—A radio access network comprising processing hardware and configured to perform the method of any one of examples 1-27.

Example 29—A method in a user device, the method comprising: receiving a first identifier from a radio access network (RAN) configured to partition a pool of identifiers into at least a plurality of identifier sets associated with a plurality of respective sets of two or more base stations in the RAN, the plurality of identifier sets including a first identifier set associated with a first base station set of the plurality of sets of two or more base stations, and the first identifier set including the first identifier; and identifying, by processing hardware of the user device and using the first identifier, a first channel carrying information for the user device from the first base station set.

Example 30—The method of example 29, wherein identifying the first channel comprises: receiving a signal from the RAN; attempting to decode the received signal using the first identifier; and identifying the first channel in response to successfully decoding the received signal using the first identifier.

Example 31—The method of example 30, wherein attempting to decode the received signal using the first identifier includes using the first identifier to attempt to de-scramble a cyclic redundancy check (CRC) included in the received signal.

Example 32—The method of any one of examples 29-31, further comprising: receiving timing information from the RAN, the timing information indicating a time the user device is to use the first identifier; wherein identifying, using the first identifier, the first channel comprises using the first identifier at the time indicated by the timing information.

Example 33—The method of example 32, wherein the user device receives the timing information and the first identifier in a same message.

Example 34—The method of any one of examples 32-33, wherein receiving the timing information comprises receiving a radio resource control (RRC) message including the timing information.

Example 35—The method of any one of examples 32-34, wherein the timing information indicates the time the user device is to use the first identifier as a number of a frame and a number of a slot within the frame.

Example 36—The method of any one of examples 29-35, further comprising: receiving a second identifier from the RAN, the second identifier included in a second identifier set of the plurality of identifier sets and associated with a second base station set of the plurality of sets of two or more base stations; and identifying, by the processing hardware and using the second identifier, a second channel carrying information for the user device from the second base station set.

Example 37—The method of example 36, further comprising: performing signal quality measurements on signals transmitted by a plurality of base stations of the RAN, the plurality of base stations including base stations included in the second base station set.

Example 38—The method of example 37, further comprising transmitting a request to the RAN that the second base station set serve the user device based on the signal quality measurements, wherein the user device receives the second identifier in response to the request.

Example 39—The method of any one of examples 37-38, further comprising: transmitting the signal quality measurements to the RAN, wherein the user device receives the second identifier in response to transmitting the signal quality measurements.

Example 40—The method of any one of examples 36-39, further comprising: transmitting an indication of the location of the user device to the RAN, wherein the user device receives the second identifier in response to transmitting the indication of the location.

Example 41—The method of example 40, wherein the indication of the location is a first indication, and wherein the method further comprises: transmitting a second indication of at least one of a bearing of the user device or a speed of the user device, wherein the user device receives the second identifier in response to transmitting the second indication.

Example 42—The method of any one of examples 29-41, further comprising: transmitting a capability message to the RAN indicating a timing gap between a time when the user device receives a new identifier and a time when the user device is capable of using the new identifier.

Example 43—The method of example 42, wherein the user device receives the second identifier at a first time, and wherein identifying the second channel comprises using the second identifier at a second time that is later than the first time by at least the timing gap.

Example 44—The method of any one of examples 42-43, wherein the capability message indicates the timing gap as a number of orthogonal frequency-division multiplexing (ODFM) symbols or slots.

Example 45—The method of any one of examples 36-44, wherein identifying the second channel comprises: receiving a signal from the RAN; attempting, by the processing hardware, to decode the received signal using the first identifier; and in response to determining that the received signal was not successfully decoded using the first identifier, attempting to decode the received signal using the second identifier, and identifying the second channel in response to successfully decoding the received signal using the second identifier.

Example 46—The method of example 45, wherein attempting to decode the received signal using the second identifier includes using the second identifier to attempt to de-scramble a cyclic redundancy check (CRC) included in the received signal.

Example 47—A user device comprising processing hardware and configured to perform the method of any one of examples 29-46.

Additional Considerations

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

What is claimed is:

1. A method in a radio access network (RAN), the method comprising:
    partitioning, by the RAN, a pool of identifiers into at least (i) a first identifier set associated with a first base station set of at least two base stations and (ii) a second identifier set associated with a second base station set of the at least two base stations, the second identifier set being non-overlapping with the first identifier set, the first base station set including at least one different base station from the second base station set;
    determining, by the RAN, that the first base station set is to serve a user device;
    assigning, by the RAN, a first identifier from the first identifier set to the user device;
    transmitting the first identifier to the user device;
    jointly transmitting, by the at least two base stations of the first base station set, first information to the user device via a first channel, including using the first identifier to indicate that the first channel carries the first information for the user device;
    receiving, by the RAN, from the user device, a message;
    determining, by the RAN, based at least in part on the message, that the second base station set is to serve the user device;
    assigning, by the RAN, a second identifier from the second identifier set to the user device;
    transmitting the second identifier to the user device; and
    jointly transmitting, by the at least two base stations of the second base station set, second information to the user device via a second channel by using the second identifier to indicate that the second channel carries the second information for the user device.

2. The method of claim 1, wherein jointly transmitting the first information includes:
    scrambling a cyclic redundancy check (CRC) associated with the first information using the first identifier; and
    jointly transmitting a signal including the scrambled CRC and the first information to the user device via the first channel.

3. The method of claim 1, wherein:
    receiving the message includes receiving, from the user device, a request that the second base station set serve the user device;; and
    determining that the second base station set is to serve the user device is based at least in part on the request.

4. The method of claim 1, wherein:
    receiving the message includes receiving at least one of a location of the user device or a speed of the user device; and
    determining that the second base station set is to serve the user device is based at least in part on the at least one of the location or the speed.

5. The method of claim 1, wherein:
    receiving the message includes receiving signal quality measurements of signals transmitted by the second base station set; and
    determining that the second base station set is to serve the user device is based at least in part on the signal quality measurements.

6. The method of claim 1, wherein transmitting the second identifier comprises transmitting the second identifier by at least one of the first base station set or the second base station set.

7. The method of claim 1, further comprising:
    determining, by the RAN, a time the first base station set will use the first identifier to jointly transmit the first information; and
    transmitting, to the user device, the timing information indicating the time the first base station set will use the first identifier.

8. The method of claim 7, wherein transmitting the first identifier and transmitting the timing information comprise transmitting the first identifier and the timing information in a same message.

9. The method of claim 1, further comprising:
    receiving, from the user device, a capability message indicating a timing gap between a time when the user device receives a new identifier and a time when the user device is capable of using the new identifier,
    wherein transmitting the first identifier includes transmitting the first identifier at a first time, and
    wherein jointly transmitting the first information includes jointly transmitting the first information at a second time that is later than the first time by at least the timing gap.

10. The method of claim 1, further comprising:
    distributing, by a master base station of the first base station set, the first identifier to at least one other base station of the first base station set, wherein transmitting the first identifier to the user device includes:
    jointly transmitting, by the master base station and the at least one other base station, the first identifier to the user device.

11. A radio access network (RAN) comprising processing hardware and configured to:
    partition a pool of identifiers into at least (i) a first identifier set associated with a first base station set of at least two base stations and (ii) a second identifier set associated with a second base station set of the two base stations, the second identifier set being non-overlapping with the first identifier set, the first base station set including at least one different base station from the second base station set;

determine that the first base station set is to serve a user device;
assign a first identifier from the first identifier set to the user device;
transmit the first identifier to the user device;
jointly transmit, by the at least two base stations of the first base station set, first information to the user device via a first channel, including using the first identifier to indicate that the first channel carries the first information for the user device;
receive, from the user device, a message;
determine, based at least in part on the message, that the second base station set is to serve the user device;
assign a second identifier from the second identifier set to the user device;
transmit the second identifier to the user device; and
jointly transmit, by the at least two base stations of the second base station set, second information to the user device via a second channel by using the second identifier to indicate that the second channel carries the second information for the user device.

12. The RAN of claim 11, wherein to jointly transmit the first information, the RAN is configured to:
scramble a cyclic redundancy check (CRC) associated with the first information using the first identifier; and
jointly transmit a signal including the scrambled CRC and the first information to the user device via the first channel.

13. The RAN of claim 11, wherein:
the message includes a request that the second base station set serve the user device, and
the RAN is configured to determine that the second base station set is to serve the user device based at least in part on the request.

14. The RAN of claim 11, wherein:
the message includes at least one of a location of the user device or a speed of the user device, and
the RAN is configured to determine that the second base station set is to serve the user device based at least in part on the at least one of the location or the speed.

15. The RAN of claim 11, wherein:
the message includes signal quality measurements of signals transmitted by the second base station set, and
the RAN is configured to determine that the second base station set is to serve to the user device based at least in part on the signal quality measurements.

16. A method in a user device, the method comprising:
receiving a first identifier from a radio access network (RAN);
jointly receiving, by of the user device, first information from at least two base stations of the first base station set via a first channel by identifying, using the first identifier, that the first channel carries the first information for the user device;
transmitting a message to the RAN;
receiving, from the RAN in response to the message, a second identifier, the second identifier included in a second identifier set and associated with a second base station set of the at least two base stations, the second identifier set being non-overlapping with the first identifier set, the first base station set including at least one different base station from the second base station set;
identifying, by the user device and using the second identifier, a second channel carrying second information for the user device from the second base station set; and
jointly receiving, by the user device, second information from the at least two base stations of the second base station set via a second channel by using the second identifier to identify that the second channel carries the second information for the user device.

17. The method of claim 16, further comprising:
performing signal quality measurements on signals transmitted by a plurality of base stations of the RAN, the plurality of base stations including base stations included in the second base station set;
wherein transmitting the message includes transmitting the signal quality measurements.

18. The method of claim 16, wherein identifying the second channel comprises:
receiving a signal from the RAN;
attempting, by the user device, to decode the received signal using the first identifier; and
in response to determining that the received signal was not successfully decoded using the first identifier,
attempting to decode the received signal using the second identifier, and
identifying the second channel in response to successfully decoding the received signal using the second identifier.

19. The method of claim 16, further comprising:
performing signal quality measurements on signals transmitted by a plurality of base stations of the RAN, the plurality of base stations including base stations included in the second base station set,
wherein transmitting the message includes transmitting a request to the RAN that the second base station set serve the user device based on the signal quality measurements.

20. The method of claim 16, wherein transmitting the message includes transmitting at least one of a location of the user device or a speed of the user device.

* * * * *